United States Patent
Yaron et al.

(10) Patent No.: US 12,123,793 B2
(45) Date of Patent: Oct. 22, 2024

(54) METHOD OF MANUFACTURE OF A STRAIN GAGE OR FLEXIBLE POLYIMIDE-BASED RESISTOR

(71) Applicant: VISHAY ADVANCED TECHNOLOGIES, LTD., Holon (IL)

(72) Inventors: Gilad Yaron, Modiin-Macabim-Reut (IL); Amos Hercowitz, Herzliya (IL); Shirley Manor, Rishon Le Zion (IL); Ofir Israeli, Tel Aviv (IL); Ofir Sudry, Ashdod (IL)

(73) Assignee: VISHAY ADVANCED TECHNOLOGIES, LTD., Holon (IL)

( * ) Notice: Subject to any disclaimer, the term of this patent is extended or adjusted under 35 U.S.C. 154(b) by 480 days.

(21) Appl. No.: 17/352,909

(22) Filed: Jun. 21, 2021

(65) Prior Publication Data

US 2021/0396608 A1    Dec. 23, 2021

(30) Foreign Application Priority Data

Jun. 23, 2020   (IL) .......................................... 275618

(51) Int. Cl.
 *G01L 1/22*      (2006.01)
 *H01C 10/10*    (2006.01)
(52) U.S. Cl.
 CPC ............ *G01L 1/2287* (2013.01); *H01C 10/10* (2013.01)
(58) Field of Classification Search
 CPC .................................................... G01L 1/2287
 See application file for complete search history.

(56) References Cited

U.S. PATENT DOCUMENTS

| | | | |
|---|---|---|---|
| 5,049,232 A | * | 9/1991 | Tola ...................... G01L 1/2287 29/621.1 |
| 2017/0172687 A1 | * | 6/2017 | Smith ................... A61B 17/062 |
| 2018/0217016 A1 | * | 8/2018 | Inamori .................... G01L 1/22 |

FOREIGN PATENT DOCUMENTS

| | | | |
|---|---|---|---|
| CN | 109000553 | * | 12/2018 |
| EP | 3 929 528 A3 | | 3/2022 |
| JP | 4-38402 A | | 2/1992 |
| JP | 4758271 B2 | | 8/2011 |
| JP | 2019-66454 A | | 4/2019 |

OTHER PUBLICATIONS

European Search Report dated Feb. 25, 2022 which issued during the prosecution of Applicant's European App No. 21178550.6.

* cited by examiner

Primary Examiner — Walter H Swanson
(74) Attorney, Agent, or Firm — Sughrue Mion, PLLC

(57) ABSTRACT

A method of manufacture of a strain gage or flexible polyimide-based resistor, the method including the steps of providing a flexible polyimide substrate, joining a conductive foil to the flexible polyimide substrate, applying a layer of photoresist to the conductive foil and thereafter, patterning the conductive foil by etching using the photoresist, wherein the method is characterized in that it includes at least one of the following steps: surface conditioning of the flexible polyimide substrate using mechanical abrasion, scrubbing of the conductive foil prior to the patterning, removal of photoresist by scrubbing following the patterning, pressurized cleaning, using deionized water, following the patterning, automated algorithmic resistance calibration and shunt trimming and forming an emulsion layer of epoxy over the conductive foil following the patterning.

17 Claims, 5 Drawing Sheets

METHOD OF MANUFACTURE OF A STRAIN GAGE OR FLEXIBLE POLYIMIDE-BASED RESISTOR

FIELD OF THE INVENTION

The present invention relates to flexible patterned conductors and methods of fabrication thereof.

BACKGROUND OF THE INVENTION

Various types of flexible patterned conductors are known in the art.

SUMMARY OF THE INVENTION

The present invention seeks to provide improved methods of fabrication of flexible patterned conductors.

There is thus provided in accordance with a preferred embodiment of the invention a method of manufacture of a strain gage or flexible polyimide-based resistor, the method including the steps of providing a flexible polyimide substrate joined to a conductive foil, applying a layer of photoresist to the conductive foil and thereafter, patterning the conductive foil by etching using the photoresist, wherein the method is characterized in that it includes at least one of the following steps:
  surface conditioning of the flexible polyimide substrate using mechanical abrasion;
  scrubbing of the conductive foil prior to the patterning;
  removal of photoresist by scrubbing following the patterning;
  pressurized cleaning, using deionized water, following the patterning;
  automated algorithmic resistance calibration and shunt trimming; and
  forming an emulsion layer of epoxy over the conductive foil following the patterning.

In accordance with one embodiment of the present invention, the providing a flexible polyimide substrate joined to a conductive foil includes attaching the conductive foil to the flexible polyimide substrate by using a resin.

In accordance with another embodiment of the present invention, the providing a flexible polyimide substrate joined to a conductive foil includes forming the polyimide substrate by casting a polyimide resin onto the conductive foil.

Preferably, the surface conditioning of the flexible polyimide substrate is applied to a surface of the substrate opposite to a surface of the substrate onto which the conductive foil is joined.

In accordance with an embodiment of the present invention, the surface conditioning of the flexible polyimide substrate is carried out downstream of the scrubbing of the conductive foil.

In accordance with another embodiment of the present invention, the surface conditioning of the flexible polyimide substrate is carried out upstream of the scrubbing of the conductive foil.

Preferably, the scrubbing of the conductive foil includes mechanical abrasion and employs abrading material which is deposited onto the conductive foil.

Preferably, the patterning the conductive foil employs applying UV radiation through a patterned mask which fully covers generally only the conductive foil, which foil is, in turn covered by the layer of photoresist.

Preferably, the removal of photoresist by scrubbing following the patterning employs a mechanical scrubber and a solvent.

Preferably, the pressurized cleaning takes place following trimming of the conductive foil downstream of the patterning.

In accordance with a preferred embodiment of the present invention, the automated resistance calibration and shunt trimming employs an algorithm which automatically controls shunt trimming in accordance with measured resistance of the patterned conductive foil.

Further in accordance with a preferred embodiment of the present invention, the algorithm which automatically controls shunt trimming in accordance with measured resistance of the patterned conductive foil includes the following steps:
  performing an initial resistance measurement;
  if a target resistance is reached, no shunt trimming is carried out;
  if the target resistance is not reached, trimming of a first shunt;
  if the target resistance is reached following the trimming of a first shunt, no further shunt trimming is carried out;
  if the target resistance is not reached following the trimming of the first shunt, automatically ascertaining whether the resistance change resulting from the trimming of a first shunt was as expected;
  if it is ascertained that the resistance change resulting from the trimming of a first shunt was not as expected, scrapping the strain gage or flexible polyimide-based resistor;
  if it is ascertained that the resistance change resulting from the trimming of a first shunt was as expected, trimming a second shunt;
  if the target resistance is reached following the trimming of a second shunt, no further shunt trimming is carried out;
  if the target resistance is not reached following trimming of the second shunt; automatically ascertaining whether the resistance change resulting from the trimming of a second shunt was as expected;
  if it is ascertained that the resistance change resulting from the trimming of a second shunt was not as expected, scrapping the strain gage or flexible polyimide-based resistor; and
  if it is ascertained that the resistance change resulting from trimming of the second shunt was as expected, trimming a third shunt.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
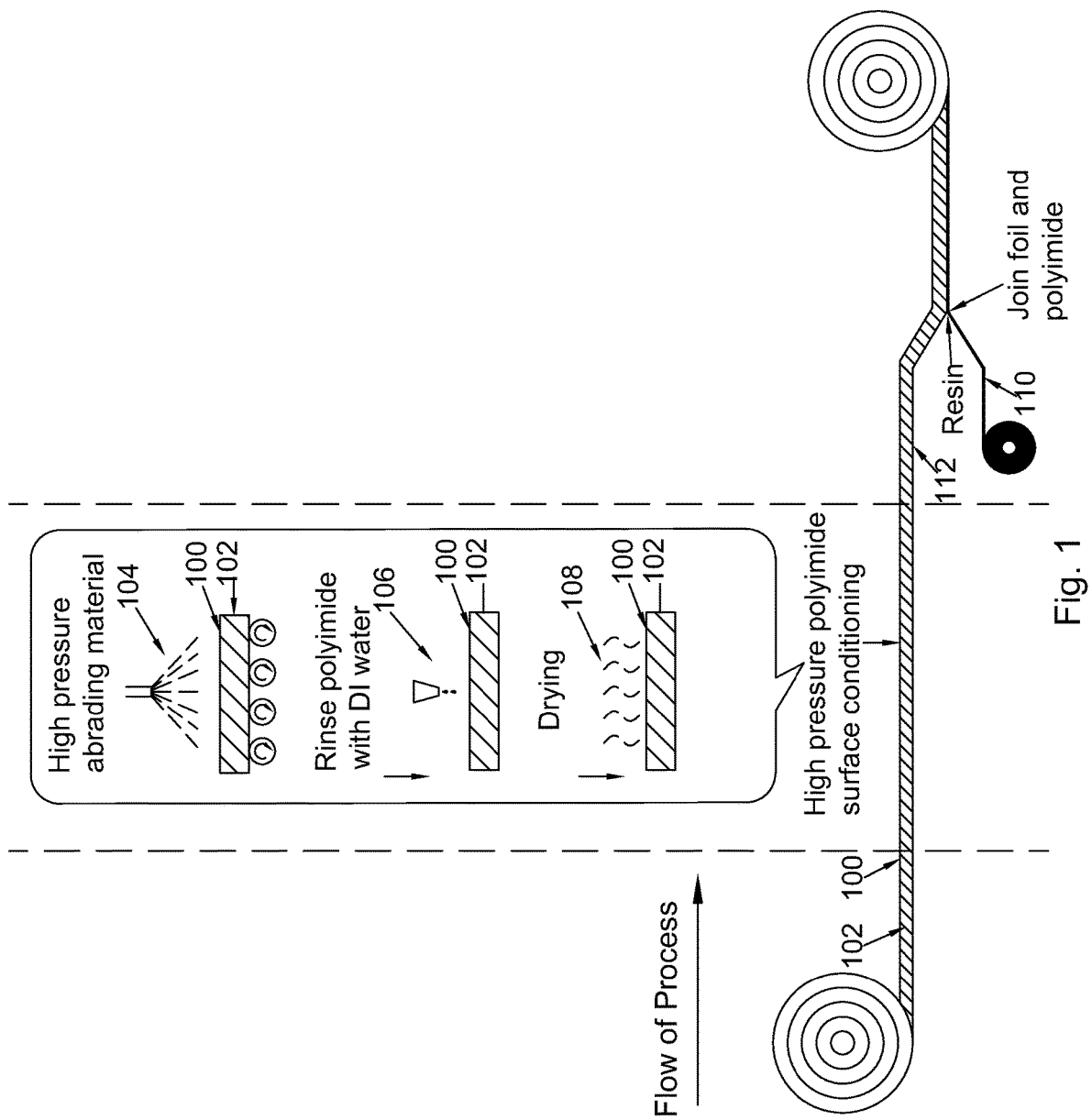
FIG. 1 is a simplified illustration of initial stages in the fabrication of flexible patterned conductors in accordance with a preferred embodiment of the present invention.

Reference is now made to FIG. 1, which is a simplified illustration of initial stages in the fabrication of flexible patterned conductors in accordance with a preferred embodiment of the present invention.

As seen in FIG. 1, a first surface 100 of a layer of polyimide 102, typically of thickness 20 microns, is subjected to surface conditioning, preferably including high pressure abrasion 104, preferably performed by spraying at high pressure, such as 30 psi, an abrading material, such as alumina, onto surface 100. Thereafter, as shown in step 106, the abraded surface 100 preferably is rinsed with deionized (DI) water and thereafter, as shown at step 108, is dried.

Preferably, downstream of the aforesaid surface conditioning, a layer of conductive foil 110, typically of thickness 2.5-5 microns and having other dimensions corresponding to that of the layer of polyimide 102, is joined to the layer of polyimide 102, at a second surface 112 thereof, preferably by use of an adhesive resin.

Figure 2:
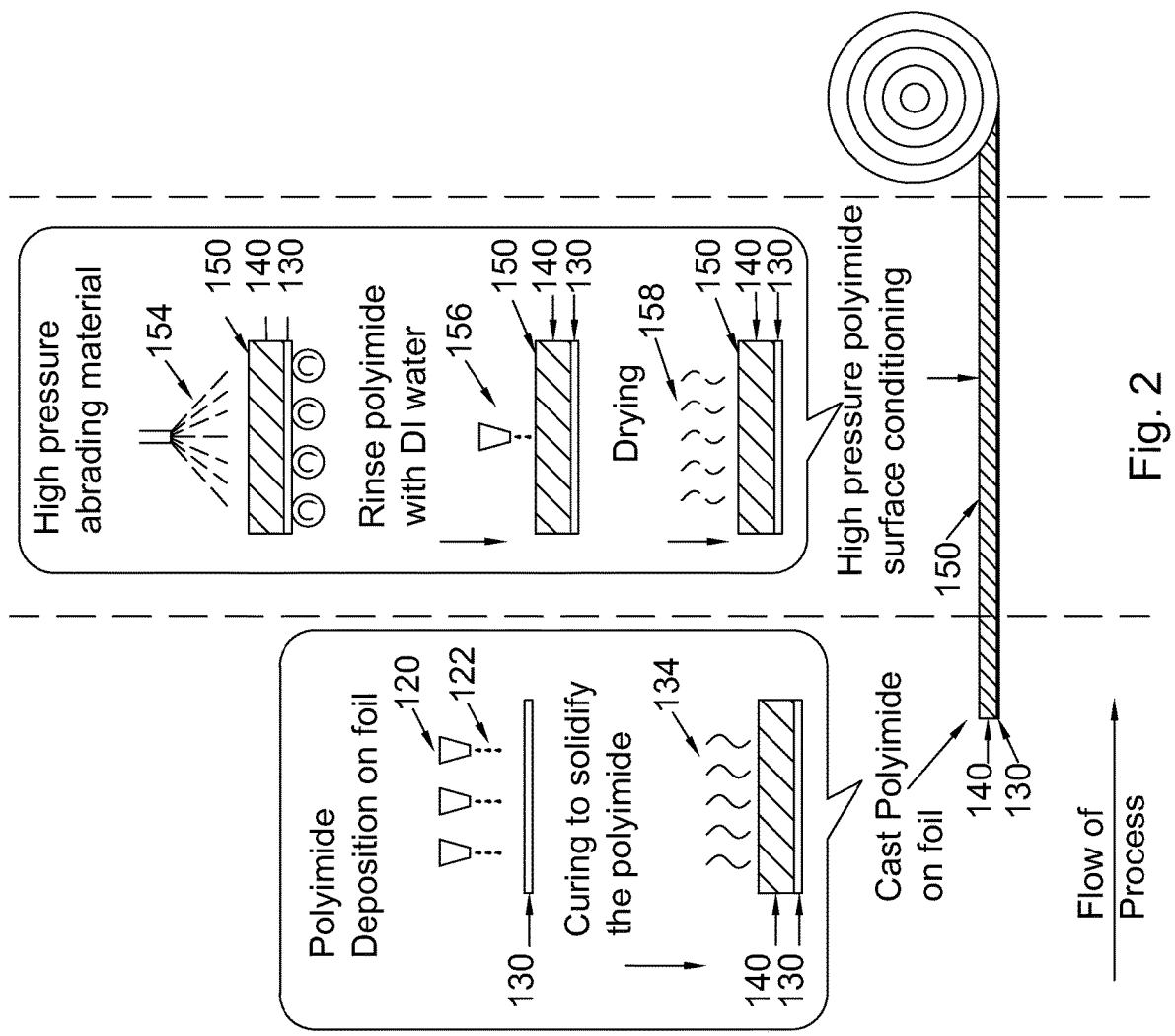
FIG. 2 is a simplified illustration of initial stages in the fabrication of flexible patterned conductors in accordance with another preferred embodiment of the present invention.

Reference is now made to FIG. 2, which is a simplified illustration of initial stages in the fabrication of flexible patterned conductors in accordance with another preferred embodiment of the present invention.

As seen in FIG. 2, at an initial step indicated as step 120, liquid polyimide 122 is preferably cast onto a layer of conductive foil 130, typically of thickness 2.5-5 microns. The resulting polyimide layer is cured, preferably by heat as shown in step 134, to provide a cured polyimide layer 140, preferably of thickness 30-40 microns, on conductive foil 130.

As seen in FIG. 2, a first surface 150, of the cured polyimide layer 140, is subsequently subjected to surface conditioning, preferably including high pressure abrasion 154, preferably performed by spraying, at high pressure, such as 30 psi, an abrading material, such as alumina, onto surface 150. Thereafter, as shown in step 156, the abraded surface 150 preferably is rinsed with deionized water and thereafter, as shown at step 158, is dried.

Figure 3:
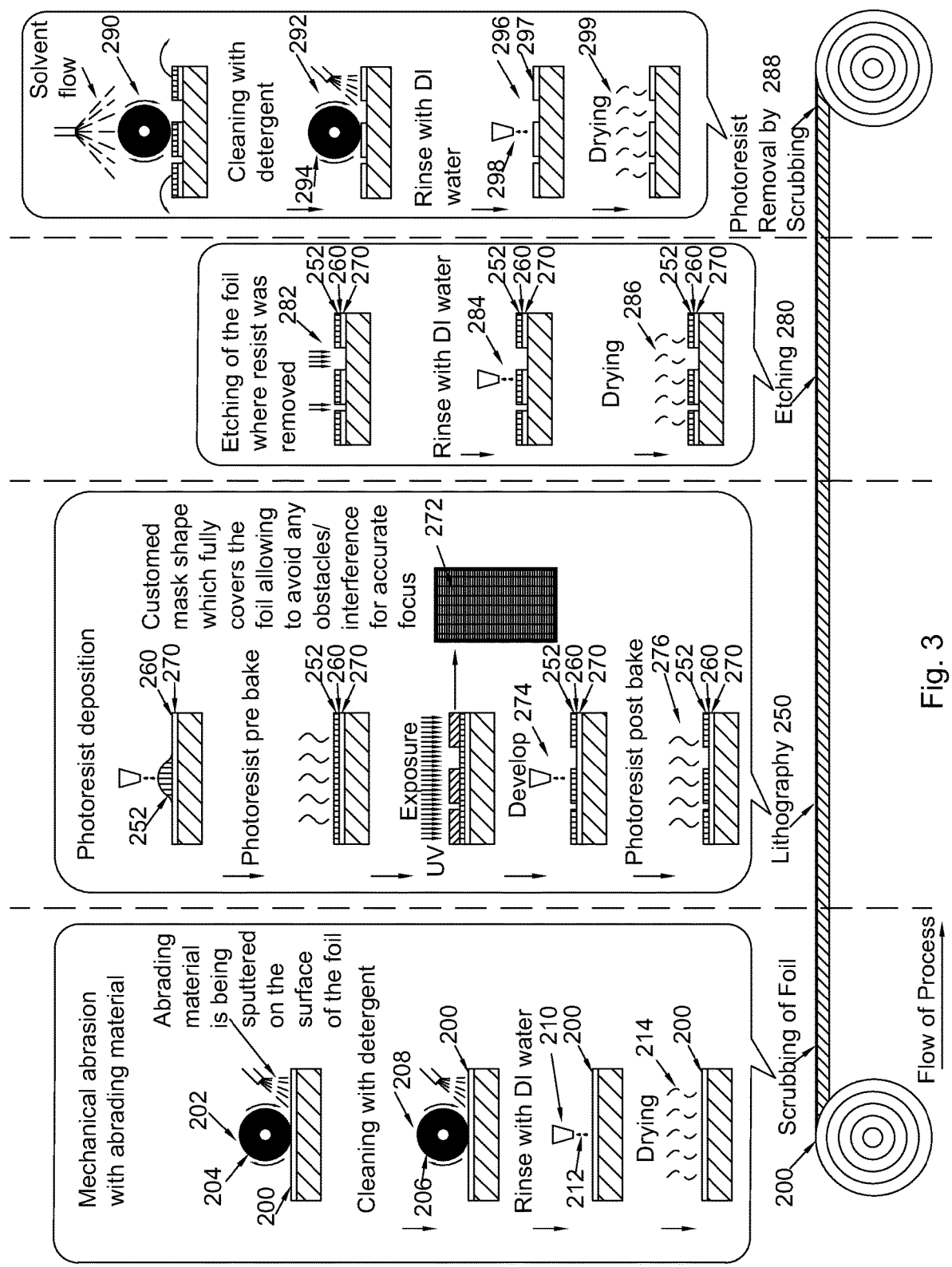
FIG. 3 is a simplified illustration of further stages in the fabrication of flexible patterned conductors in accordance with preferred embodiments of the present invention.

Reference is now made to FIG. 3, which is a simplified illustration of further stages in the fabrication of flexible patterned conductors in accordance with preferred embodiments of the present invention. The stages shown in FIG. 3 follow the initial stages described hereinabove with reference to either of FIGS. 1 & 2.

As seen in FIG. 3, downstream of the surface conditioning, rinsing and drying of the polyimide described hereinabove, a surface 200 of the conductive foil is scrubbed, at a step 202, preferably by being mechanically abraded using an abrading material such as alumina slurry, which is preferably deposited onto surface 200, and a roller 204, preferably formed of polyvinyl acetate (PVA). Thereafter, the abraded surface 200 is cleaned using a surface cleaner, such as sodium hydroxide, which is preferably sprayed onto the abraded surface 200, and a roller 206, preferably formed of PVA, as shown in step 208. Thereafter, as shown in step 210, the cleaned abraded surface 200 preferably is rinsed with deionized water as shown at step 212 and, as shown in step 214, is dried.

As further shown in FIG. 3, at a step 250, a photoresist layer 252 is formed and patterned by photolithography. Step 250 includes deposition of photoresist layer 252 onto cleaned, abraded, rinsed and dried surface 200, here designated by reference numeral 260, of the conductive foil, here designated by reference numeral 270, baking of the photoresist layer 252 and patterning exposure of photoresist layer 252. It is a particular feature of an embodiment of the present invention that the exposure employs a mask 272, which fully covers generally only the conductive foil 270, thereby allowing extremely accurate focus during exposure of photoresist layer 252 and thus extremely accurate patterning of photoresist layer 252. Exposure is preferably followed by developing, at step 274, the patterned photoresist layer 252 and baking of the developed patterned photoresist layer 252, as shown in step 276.

As additionally shown in FIG. 3, following the photolithography patterning step 250, an etching step 280 is performed. Step 280 includes etching, at a step 282, of those portions of conductive foil 270 underlying areas where the photoresist layer 252 was removed in the preceding photolithography patterning step 250, rinsing, at a step 284, of the etched conductive foil, preferably with deionized (DI) water, and drying, at a step 286.

Further shown in FIG. 3 is photoresist removal by scrubbing, indicated generally as step 288, preferably employing a mechanical scrubber 290 and a suitable solvent. Further cleaning, indicated at step 292, employs a detergent and a roller 294. Thereafter, as shown in step 296, the cleaned patterned conductive foil surface 297 preferably is rinsed with deionized water 298, and, as shown in step 299, is dried.

Figure 4:
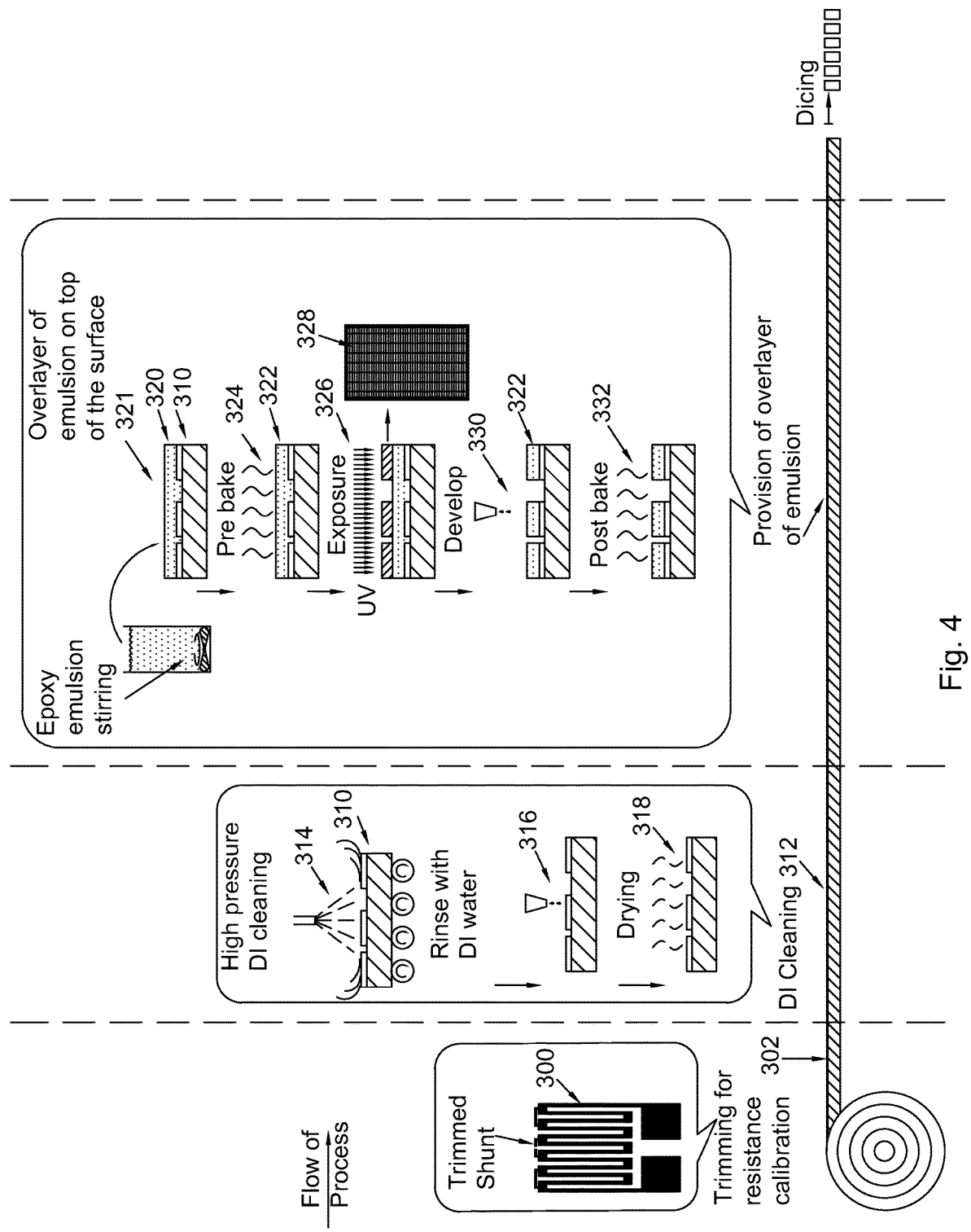
FIG. 4 is a simplified illustration of still further stages in the fabrication of flexible patterned conductors in accordance with preferred embodiments of the present invention.

Reference is now made to FIG. 4, which is a simplified illustration of still further stages in the fabrication of flexible patterned conductors in accordance with preferred embodiments of the present invention.

As seen in FIG. 4, following etching of the conductive foil 270, as described above with reference to FIG. 3, the patterned conductive foil, here designated by reference numeral 300, is trimmed for precise resistance calibration, at a step designated by reference numeral 302. Step 302 is preferably controlled by a computerized algorithm, a preferred embodiment of which is described hereinbelow with reference to FIG. 5.

Following trimming step 302, the resulting product, designated by reference numeral 310, including the patterned and trimmed conductive foil and the exposed underlying polyimide layer, is subjected to cleaning with deionized water at a step designated by reference numeral 312, which includes cleaning, at a step 314, with a high pressure spray of deionized water, rinsing, at a step 316, with deionized water and drying, at a step 318.

Thereafter, an epoxy emulsion 320 is provided over the cleaned product 310, as shown in step 321, the resulting emulsion layer 322 is baked, as shown in step 324, and exposed, as shown in step 326. It is a particular feature of an embodiment of the present invention that the exposure employs a mask 328, which fully covers generally only the conductive foil, thereby allowing extremely accurate focus during exposure and thus extremely accurate patterning of the emulsion layer 322. Thereafter, the exposed emulsion layer 322 is developed at a step designated by reference numeral 330 and baked at a step designated by reference numeral 332.

Finally, dicing of the product takes place, preferably to provide individual resistors or strain gages.

Figure 5:
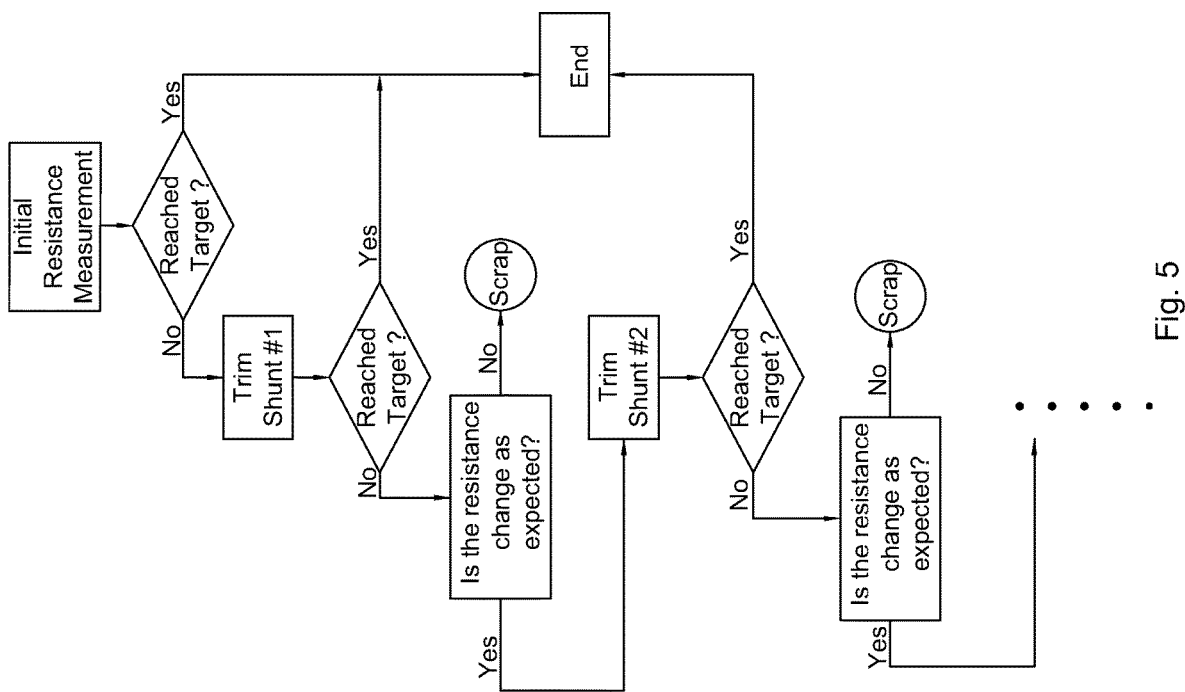
FIG. 5 is a simplified flow chart illustrating operation of a resistance calibration step shown in FIG. 4.

Reference is now made to FIG. 5, which is a simplified flow chart illustrating operation of a resistance calibration step 302, referenced hereinabove with reference to FIG. 4.

As seen in FIG. 5, an initial resistance measurement is performed. If a target resistance is reached, no shunt trimming is required. If the target resistance is not reached, trimming of a first shunt is carried out. If a target resistance is reached following this trimming step, no further shunt trimming is required. If the target resistance is not reached following the trimming step, an analysis is carried out as to whether the resistance change resulting from trimming was as expected. If the resistance change resulting from trimming was not as expected, the product is scrapped. If the resistance change resulting from trimming was as expected, this indicates that the target resistance could possibly be attained by trimming of an additional shunt and a second shunt of the product is trimmed. If the target resistance is reached following this second trimming step, no further trimming is required. If the target resistance is not reached following the second trimming step, an analysis is carried out as to whether the resistance change resulting from the second trimming step was as expected. If the resistance change resulting from the second trimming step was not as expected, the product is scrapped. If the resistance change resulting from the second trimming step was as expected, this indicates that the target resistance could possibly be attained by trimming of an additional shunt and a third shunt of the product is trimmed. The process continues and further shunts are trimmed until the target resistance is achieved or until a decision is made to scrap the product since the target resistance cannot be reached.

It will be appreciated by persons skilled in the art that the present invention is not limited by what has been particularly shown and described hereinabove. Rather the scope of the present invention includes both combinations and subcombinations of various features described herein and claimed as well as modifications and variations thereof which are not in the prior art.

The invention claimed is:

1. A method of manufacture of a strain gage or flexible polyimide-based resistor, the method comprising the steps of:
   providing a flexible polyimide substrate joined to a conductive foil;
   surface conditioning of the flexible polyimide substrate using mechanical abrasion, said mechanical abrasion comprising spraying an abrading material at high pressure;
   applying a layer of photoresist to the conductive foil; and
   thereafter, patterning the conductive foil by etching using said photoresist,
   the method also comprising:
   scrubbing of said conductive foil prior to said patterning, said scrubbing of said conductive foil including mechanical abrasion and employing abrading material which is deposited onto said conductive foil.

2. The method of manufacture according to claim 1 and wherein said providing the flexible polyimide substrate joined to the conductive foil comprises attaching said conductive foil to said flexible polyimide substrate by using a resin.

3. The method of manufacture according to claim 2 and wherein said surface conditioning of the flexible polyimide substrate is applied to a surface of said substrate opposite to a surface of said substrate onto which said conductive foil is joined.

4. The method of manufacture according to claim 2 also comprising scrubbing of said conductive foil prior to said patterning and wherein said surface conditioning of the flexible polyimide substrate is carried out downstream of said scrubbing of said conductive foil.

5. The method of manufacture according to claim 2 also comprising scrubbing of said conductive foil prior to said patterning and wherein said surface conditioning of the flexible polyimide substrate is carried out upstream of said scrubbing of said conductive foil.

6. The method of manufacture according to claim 1 and wherein said providing the flexible polyimide substrate joined to the conductive foil comprises forming said flexible polyimide substrate by casting a polyimide resin onto said conductive foil.

7. The method of manufacture according to claim 6 and wherein said surface conditioning of the flexible polyimide substrate is applied to a surface of said substrate opposite to a surface of said substrate onto which said conductive foil is joined.

8. The method of manufacture according to claim 6 also comprising scrubbing of said conductive foil prior to said patterning and wherein said surface conditioning of the flexible polyimide substrate is carried out downstream of said scrubbing of said conductive foil.

9. The method of manufacture according to claim 6 also comprising scrubbing of said conductive foil prior to said patterning and wherein said surface conditioning of the flexible polyimide substrate is carried out upstream of said scrubbing of said conductive foil.

10. The method of manufacture according to claim 1 and wherein said surface conditioning of the flexible polyimide substrate is applied to a surface of said substrate opposite to a surface of said substrate onto which said conductive foil is joined.

11. The method of manufacture according to claim 1 also comprising scrubbing of said conductive foil prior to said patterning and wherein said surface conditioning of the flexible polyimide substrate is carried out downstream of said scrubbing of said conductive foil.

12. The method of manufacture according to claim 1 also comprising scrubbing of said conductive foil prior to said patterning and wherein said surface conditioning of the flexible polyimide substrate is carried out upstream of said scrubbing of said conductive foil.

13. The method of manufacture according to claim 1 and wherein said patterning the conductive foil employs applying UV radiation through a patterned mask which fully covers generally only said conductive foil, which foil is, in turn covered by said layer of photoresist.

14. The method of manufacture according to claim 1 also comprising removal of photoresist by scrubbing following said patterning and wherein said removal of photoresist by scrubbing following said patterning employs a mechanical scrubber and a solvent.

15. The method of manufacture according to claim 1 also comprising pressurized cleaning, using deionized water, following said patterning and wherein said pressurized cleaning takes place following trimming of said conductive foil downstream of said patterning.

16. The method of manufacture according to claim 1 also comprising automated algorithmic resistance calibration and shunt trimming and wherein said automated resistance calibration and shunt trimming employs an algorithm which automatically controls shunt trimming in accordance with measured resistance of said patterned conductive foil.

17. A method of manufacture of a strain gage or flexible polyimide-based resistor, the method comprising the steps of:
   providing a flexible polyimide substrate joined to a conductive foil;
   applying a layer of photoresist to the conductive foil; and thereafter, patterning the conductive foil by etching using said photoresist, said method also comprising automated algorithmic resistance calibration and shunt trimming employing an algorithm which automatically controls shunt trimming in accordance with measured resistance of said patterned conductive foil, said algorithm which automatically controls shunt trimming in accordance with measured resistance of said patterned conductive foil including the following steps:

performing an initial resistance measurement;

if a target resistance is reached, no shunt trimming is carried out;

if said target resistance is not reached, trimming of a first shunt;

if said target resistance is reached following said trimming of the first shunt, no further shunt trimming is carried out;

if said target resistance is not reached following said trimming of the first shunt; automatically ascertaining whether a resistance change resulting from said trimming of the first shunt was as expected;

if it is ascertained that the resistance change resulting from said trimming of the first shunt was not as expected, scrapping the strain gage or flexible polyimide-based resistor;

if it is ascertained that the resistance change resulting from said trimming of the first shunt was as expected, trimming a second shunt;

if said target resistance is reached following said trimming of the second shunt, no further shunt trimming is carried out;

if said target resistance is not reached following trimming of the second shunt, automatically ascertaining whether a resistance change resulting from said trimming of the second shunt was as expected;

if it is ascertained that the resistance change resulting from said trimming of the second shunt was not as expected, scrapping the strain gage or flexible polyimide-based resistor; and if it is ascertained that the resistance change resulting from said trimming of the second shunt was as expected, trimming a third shunt.

\* \* \* \* \*